US00RE39901E

(19) United States
(12) Reissued Patent
Hattori et al.

(10) Patent Number: US RE39,901 E
(45) Date of Reissued Patent: Oct. 30, 2007

(54) INITIALIZATION OF PHASE-CHANGE OPTICAL RECORDING MEDIUM

(75) Inventors: Kyohji Hattori, Ebina (JP); Fumiya Ohmi, Sagamihara (JP); Kenichi Aihara, Machida (JP); Katsuyuki Yamada, Mishima (JP); Yuki Nakamura, Yokohama (JP); Eiji Noda, Kawasaki (JP); Michihisa Takahashi, Atsugi (JP); Yujiro Kaneko, Machida (JP); Yukio Ide, Mishima (JP)

(73) Assignee: Ricoh Company, Ltd., Tokyo (JP)

(21) Appl. No.: 10/825,441

(22) Filed: Apr. 14, 2004

Related U.S. Patent Documents

Reissue of:
(64) Patent No.: 6,445,669
Issued: Sep. 3, 2002
Appl. No.: 09/471,345
Filed: Dec. 23, 1999

(30) Foreign Application Priority Data

Dec. 24, 1998 (JP) ..... 10-367529

(51) Int. Cl.
*G11B 7/125* (2006.01)
*G11B 7/26* (2006.01)

(52) U.S. Cl. ..... 369/116; 369/121; 369/13.03

(58) Field of Classification Search ..... 369/116, 369/121, 13.03, 59.11, 59.12, 47.5, 47.53, 369/13.38, 13.26, 13.28, 53.37, 275.2
See application file for complete search history.

(56) References Cited

U.S. PATENT DOCUMENTS

| | | | | |
|---|---|---|---|---|
| 5,784,353 A | | 7/1998 | Matsui | 369/102 |
| 5,784,355 A | | 7/1998 | Abe | 369/59.12 |
| 5,875,160 A | | 2/1999 | Harigaya et al. | 369/116 |
| 5,974,025 A | * | 10/1999 | Yamada et al. | 369/288 |
| 6,256,286 B1 | | 7/2001 | Ogawa | 369/116 |
| 6,278,674 B1 | | 8/2001 | Araki et al. | 369/116 |
| 6,373,802 B1 | * | 4/2002 | Hattori et al. | 369/53.27 |
| 6,373,814 B2 | * | 4/2002 | Kasami et al. | 369/275.2 |

FOREIGN PATENT DOCUMENTS

| | | |
|---|---|---|
| EP | 848379 A2 | 6/1998 |
| EP | 848379 A3 | 8/2000 |
| JP | 2-42661 | 2/1990 |
| JP | 4-34725 | 2/1992 |
| JP | 4113519 | 4/1992 |
| JP | 9320120 | 12/1997 |
| JP | 10-27344 | 1/1998 |
| JP | 10112065 | 4/1998 |
| JP | 10208310 | 8/1998 |
| JP | 10312582 | 11/1998 |

* cited by examiner

*Primary Examiner*—Thang V. Tran
(74) *Attorney, Agent, or Firm*—Cooper & Dunham LLP

(57) ABSTRACT

A method of initializing a phase-change optical information recording medium is provided, using an optical system incorporating a semiconductor laser device. The laser device is characterized by a specified spatial power distribution. In a spatial distribution of the laser power focused on the recording medium, in the direction perpendicular to guide tracks the laser device preferably has less average smaller in both end regions of the spatial distribution, which have each 10% of the width at half maximum of the distribution, than the average in the center region of the full width at half maximum of the distribution.

15 Claims, 7 Drawing Sheets

LASER BEAM INTENSITY DISTRIBUTION ON OPTICAL DISK

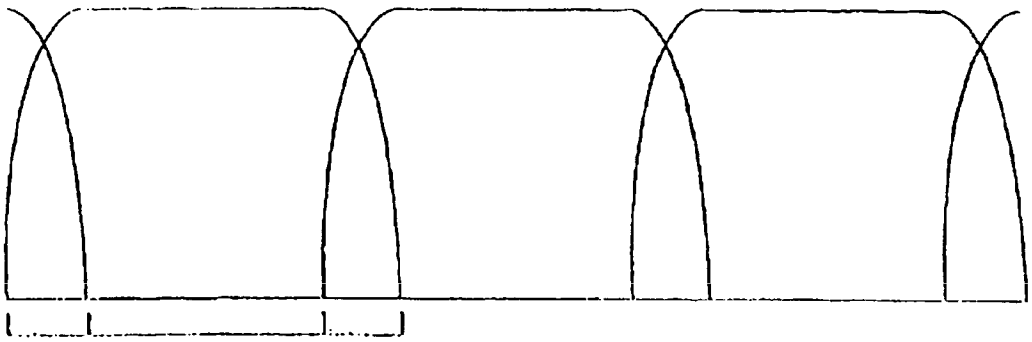
LASER BEAM INTENSITY DISTRIBUTION ON OPTICAL DISK
FIG. 4A
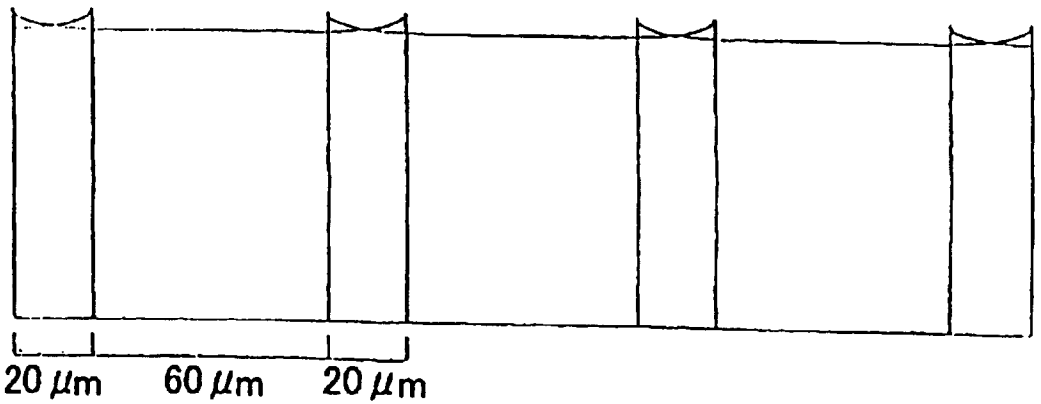
LASER BEAM INTENSITY DISTRIBUTION
FIG. 4B *PRIOR ART*

INITIALIZATION OF PHASE-CHANGE OPTICAL RECORDING MEDIUM

Matter enclosed in heavy brackets [ ] appears in the original patent but forms no part of this reissue specification; matter printed in italics indicates the additions made by reissue.

BACKGROUND

1. Field

The present invention relates to a method of initializing an information recording medium by irradiating light beams, and particularly to a method for a rewritable phase-change optical recording layer that is capable of giving rise to a phase change to achieve repeated read-write operations by laser beam irradiation.

2. Description

Optical recording media have recently come into wide use as a viable information storage and archival means of large capacity. Among these media, demands have increased for a phase-change optical recording medium for use in a CD-R disk, for example, because of its repeatable (or writable) read/write capability.

The phase-change optical recording medium is generally provided on a disk-shaped substrate with several layers successively formed by, for example, the sputtering method, such as a first dielectric layer, a recording layer, a second dielectric layer and a layer either of metal or alloy, in the order recited. In addition, a layer composed of ultraviolet curing resin is formed thereon by spin coating, for example.

Since the thus formed recording layer is in an amorphous state, process steps of crystallization (i.e., "initialization" steps) are to be carried out before recording onto the recording layer by a recording system or disk drive.

During the process steps, the recording layer is once heated to a temperature above its melting temperature. When the recording layer is then cooled relatively slowly, it transforms into a crystalline state. It transforms into an amorphous state when cooled rapidly.

As a suitable material for forming the substrate, polycarbonate resin is frequently used for its excellent properties such as mechanical stability, light weight and low costs, among others.

When the entire recording disk is initialized all at once, the allowable temperature of the polycarbonate substrate may be exceeded by heat from a large power density of light beam irradiation. Therefore, the initialization steps are generally carried out gradually over the disk area, in which disk portions are successively irradiated by a focused intense beam from a laser device along with the rotation of the disk.

To be more specific, the initialization of an optical disk is achieved by providing a laser device with its longer axis of the power distribution perpendicular to disk tracks and by imparting a gradual displacement of the laser device along the radial direction of the disk (i.e., perpendicular to the direction of disk tracks).

When a large fluctuation in the laser power exists along the longer axis of the laser power distribution perpendicular to disk tracks, reflectivity values of the optical disk after the initialization may undesirably fluctuate along the perpendicular direction. This may result in scatter in tracking signals, which is a drawback throughout succeeding reading and signal processing steps of the optical disk.

In addition, initialization steps using the above described background art laser device and optical system take a relatively long time to complete, since the optical disk is irradiated successively, portion-wise along with the rotation of the disk and cooled relatively slowly.

SUMMARY

It is therefore an object of the present disclosure to provide improved method and apparatus of optical disk initialization, which overcome the above-noted difficulties.

It is another object of the present disclosure to provide a method of initializing a phase-change optical disk, especially realizing homogeneous cyrstallization and concomitant reflectivity of a recording layer over the optical disk in the direction perpendicular to disk tracks, thereby achieving excellent characteristics of recording and tracking signals throughout reading and signal processing steps with a disk drive system.

It is still another object of the present disclosure to provide a method of initializing a phase-change optical disk, capable of reducing the initialization time and thereby increasing the productivity of the optical disk.

The present inventors first examined closely initialization process steps of a phase-change optical disk as follows.

(1) The spatial distribution of a laser power used in the optical disk initialization affects considerably the characteristics of outputted data signals and of tracking signals.

(2) Regarding the spatial laser power distribution in the radial direction of the disk (i.e., perpendicular to the direction of disk tracks), signal characteristics of the optical disk after the initialization are found improved by bringing the laser power in both end regions of the spatial distribution to be equal to, or smaller than, that in the center region of the distribution.

Namely, since the spatial distribution of the laser power is generally elliptical-shaped. as will be described hereinbelow, by reducing the laser power in both edge regions of the elliptical spatial distribution in the major axis direction of the distribution ellipse, a homogeneous initialization can be achieved in the direction perpendicular to disk tracks.

(3) The amount of electrical current is known to be concentrated in the layer edge portions in an active layer and reflective layer in a background art laser device. This tends to increase the laser power in the edge regions along a longer axis direction of the spatial distribution. The above-noted increase in the laser power in the edge portions can be obviated by adequately polishing edge surfaces of at least one of an active layer and a reflective layer substantially perpendicular to the direction of the laser emission of the semiconductor laser device.

(4) When the laser power increase in the edge portions is found even after the polishing, this increase may be adjusted by further providing at least one optical unit such as, for example, a filter in the optical system, which is capable of attenuating the laser beams so as to achieve a laser power distribution appropriate for the disk initialization.

(5) The intensity of laser emission is known to decrease gradually with its operating time, in general. Therefore, by repeatedly turning on and off the laser energizing current within its allowable range either prior to incorporation into the optical system, or prior to the practical operations after the incorporation, the laser device can be made to have a laser power distribution with a decreased power in both edge regions of the spatial power distribution, which is adequately for use in the disk initialization.

(6) When an optical system is used for disk initialization incorporating the thus prepared laser device having a decreased power in the both edge regions of the spatial power distribution, a displacement step (or the amount of displacement relative to the disk track position in the direction perpendicular to the disk tracks) of an initialization head unit including the laser device per one disk rotation, is preferably larger than one half of, and smaller than, the width at half maximum of the spatial laser power distribution. This facilitates the initialization steps faster for the optical disks.

(7) In addition, the laser device to be incorporated into the optical system is found to preferably have laser emissions with the width at half maximum of at least 80 microns, of the spatial power distribution on the recording medium along the longer axis of the spatial distribution (or in the direction perpendicular to guide tracks). This also facilitates making the initialization steps faster for the optical disks.

According to the examination described above, the present disclosure is summarized as follows.

In order to achieve the foregoing and other objects, and to overcome the shortcomings discussed earlier, an improved method of initializing a phase-change optical information recording medium is provided, using an optical system incorporating a semiconductor laser device.

The laser device disclosed herein is characterized by its specified spatial power distribution. Namely, in the spatial distribution of laser power focused on the recording medium in the direction perpendicular to guide tracks, the laser device preferably has an average smaller in both end regions of the distribution, each of which corresponds to 10% of the width at half maximum of the distribution, than the average in the center region of the full width at half maximum of the distribution.

According to one aspect disclosed herein, edge surfaces substantially perpendicular to the direction of the laser emission, of at least one of an active layer and a reflective layer of the semiconductor laser device may preferably be polished such that an appropriate spatial laser power distribution such as mentioned above can be obtained.

According to another aspect disclosed herein, the optical system used in the disk initialization is further provided with at least one optical unit such as, for example, a filter which is capable of attenuating the laser beam intensity so as to achieve an appropriate laser power distribution.

According to still another aspect disclosed herein, the laser device may be cured for at least about six hours by being energized with at least about 80% of a maximum allowable electric power prior to the initialization of the recording medium so as to attain an appropriate laser power distribution.

According to another aspect disclosed herein, the displacement step of an initialization head unit including the laser device is preferably larger than one half of, and smaller than, the width at half maximum of the spatial laser power distribution.

According to another aspect disclosed herein, the laser device preferably has emitted light beams having a width at half maximum of at least 80 microns in the spatial power distribution focused on the recording medium in the direction perpendicular to guide tracks.

With the method and optical system incorporating the laser device disclosed herein, a homogeneous crystallization and concomitant reflectivity of the recording layer can be achieved in the optical disk through initialization steps. As a result, excellent characteristics of tracking signals and outputted data signals after the disk initialization can be achieved with thus initialized optical disks in a reduced initialization time, thereby increasing productivity of the optical disk.

BRIEF DESCRIPTION OF THE DRAWINGS

Preferred embodiments will be described in detail with reference to the following drawings wherein:

FIG. 4A shows a laser power distribution focussed on an optical disk with a laser device according to one embodiment disclosed herein;

FIG. 4B shows a laser power distribution focussed on an optical disk with a background art laser device;

DESCRIPTION OF THE PREFERRED EMBODIMENTS

Figure 1:
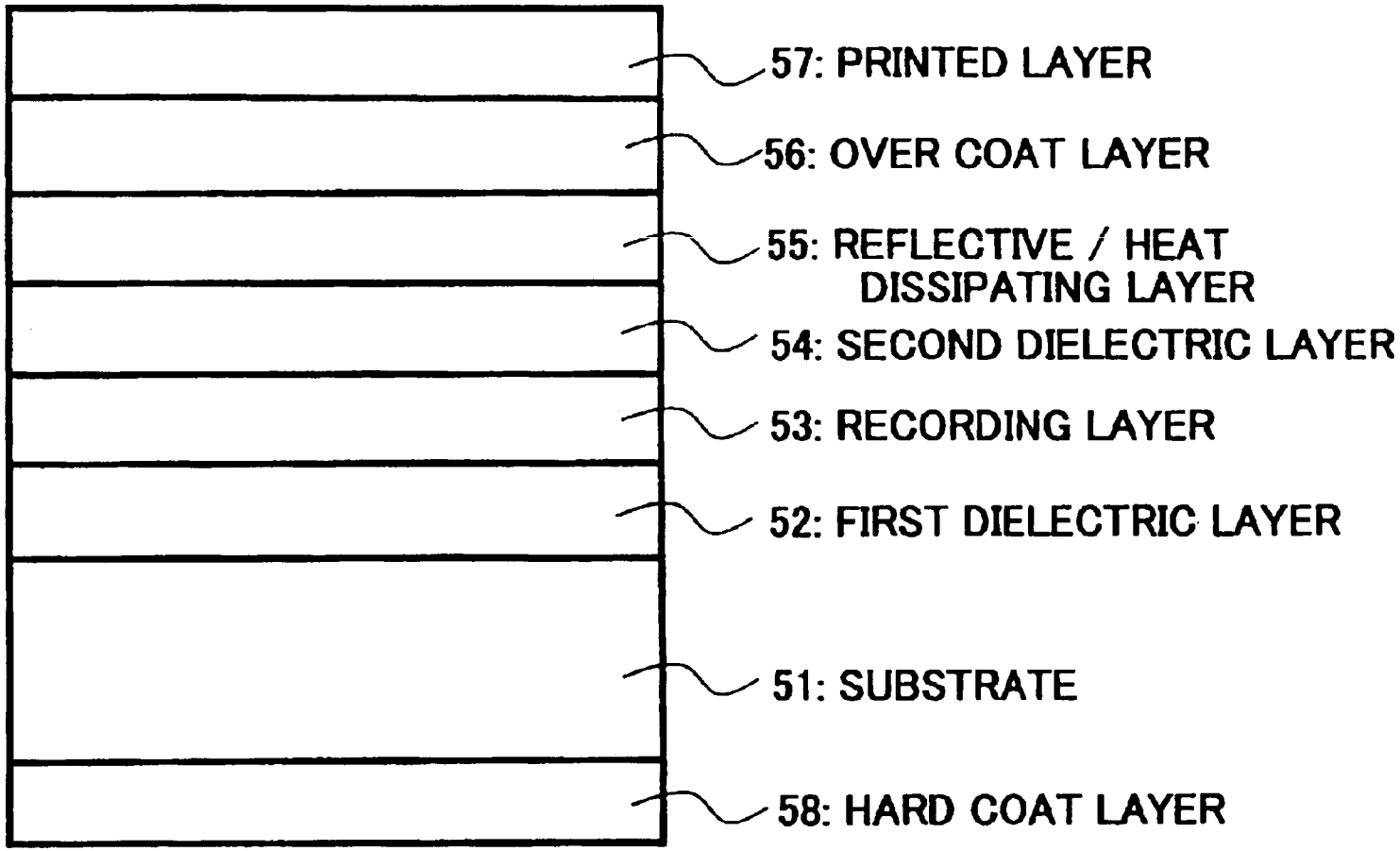
FIG. 1 is a cross sectional view illustrating a phase-change optical disk according to one embodiment disclosed herein.

FIG. 1 is a cross-sectional view illustrating a basic configuration of a phase-change optical disk.

Referring to FIG. 1, a phase-change optical disk includes a substrate 51 having a pregrooved guide track, with the following layers formed thereon in the order recited, a first dielectric layer 52, a recording layer 53, a second dielectric layer 54, a reflective/heat-dissipating layer 55, and an overcoat layer 56.

In addition, the optical disk may further include a printed layer 57 formed on the overcoat layer 56 and a hard coat layer 58 formed on the backside of the substrate 1.

Suitable materials for use as the substrate 1 include glass, ceramics, resins and similar materials. Among these, resins may preferably be employed for its satisfactory features, such as easy for molding, low in costs and light in weight. Specific examples of the resins include, but are not limited to, polycarbonate resins and acrylic resins.

The substrate 1 is disc-shaped, in general, and may also be either card-or sheet-shaped. The substrate 1 preferably has a thickness of 1.2 mm or 0.6 mm, but is not limited thereto.

Further, the first dielectric layer 52, recording layer 53, second dielectric layer 54, and reflective layer 55 are formed by, for example, a sputtering method, while the overcoat layer 56 is formed by coating an ultraviolet curing resin composition.

Suitable materials for use in the recording layer 53 includes preferably, a quaternary compound containing Ag, In, Sb and Te, as the main ingredient, which is capable of forming a phase-change recording composition. This material can be used in the recording layer for its excellent characteristics such as high sensitivity and speed of either recording or erasing and erasure ratio. In this context, it may be noted that recording is achieved by bringing the recording layer into an amorphous state, while erasing is achieved by bringing the recording layer into a crystalline state. The recording layer 53 preferably has a thickness of 15 to 35 nanometers.

Suitable materials for use in the first dielectric layer 52 and second dielectric layer 54 include SiO, $SiO_2$, $TiO_2$ and other oxides; $Si_3N_4$, AlN and other nitrides; ZnS, $In_2S_3$ and other sulfides; SiC, TaC and other carbides; and diamond-like carbon. The first dielectric layer preferably has a thickness of 65 to 130 nanometers, while the second dielectric layers has a thickness of 15 to 45 nanometers.

For forming the reflective/heat-dissipating layer 55, materials preferably used are Al, Au, Ag, Cu, Ta and other metals, and alloys formed in combination thereof. This layer preferably has a thickness of 7 to 180 nanometers.

For forming the hard coat layer 58, an ultraviolet curing resin material is spin coated, in general, to have a thickness of 7 to 15 nanometers.

As electromagnetic radiation and energy beams useful for initialization of the information data recording medium discussed herein, laser light, electron beams, ultraviolet light, visible light, infrared light and microwave radiation may be utilized. Among these radiation and beams, light beams from a semiconductor laser device (i.e., laser diode or LD) are preferably used for its compactness and controllability of the device operations, among others.

Process steps and apparatus for the medium initialization will be detailed hereinbelow.

The apparatus for the initialization includes a rotating mechanism for rotating an optical disk, a driving mechanism for radially displacing the rotation axis of the optical disk, a light emitting (LD) unit, a focusing mechanism for focusing laser beams onto a recording layer on the optical disk, and a control system for electrically controlling the entire apparatus.

As aforementioned, a recording layer in an optical disk is formed in an amorphous state after the layer forming step by, for example, a sputtering method.

In order to initialize this optical disk, the recording layer in the amorphous state is transformed into a crystalline state by laser beam heating and following quenching steps. Further, the optical disk can be initialized efficiently by simultaneously heating the recording layer portions located on a plurality of, for example, more than ten, pregrooved guide tracks of the rotating optical disk.

When the disk is rotated in the constant angular velocity (CAV) mode, the circumferential velocity is different depending on radius. For example, the velocity in an outer edge portion having a radius of about 55 mm is almost twice that of a middle disk portion having a radius of about 25 mm. This difference in the velocity results in difference in the laser beam power irradiated onto the disk surface, thereby causing different effects of the initialization. Therefore, the initialization is preferably carried out in the constant linear velocity (CLV) mode, in which the circumferential velocity is controlled to be constant throughout the radius change during the disk rotation.

Figure 2:
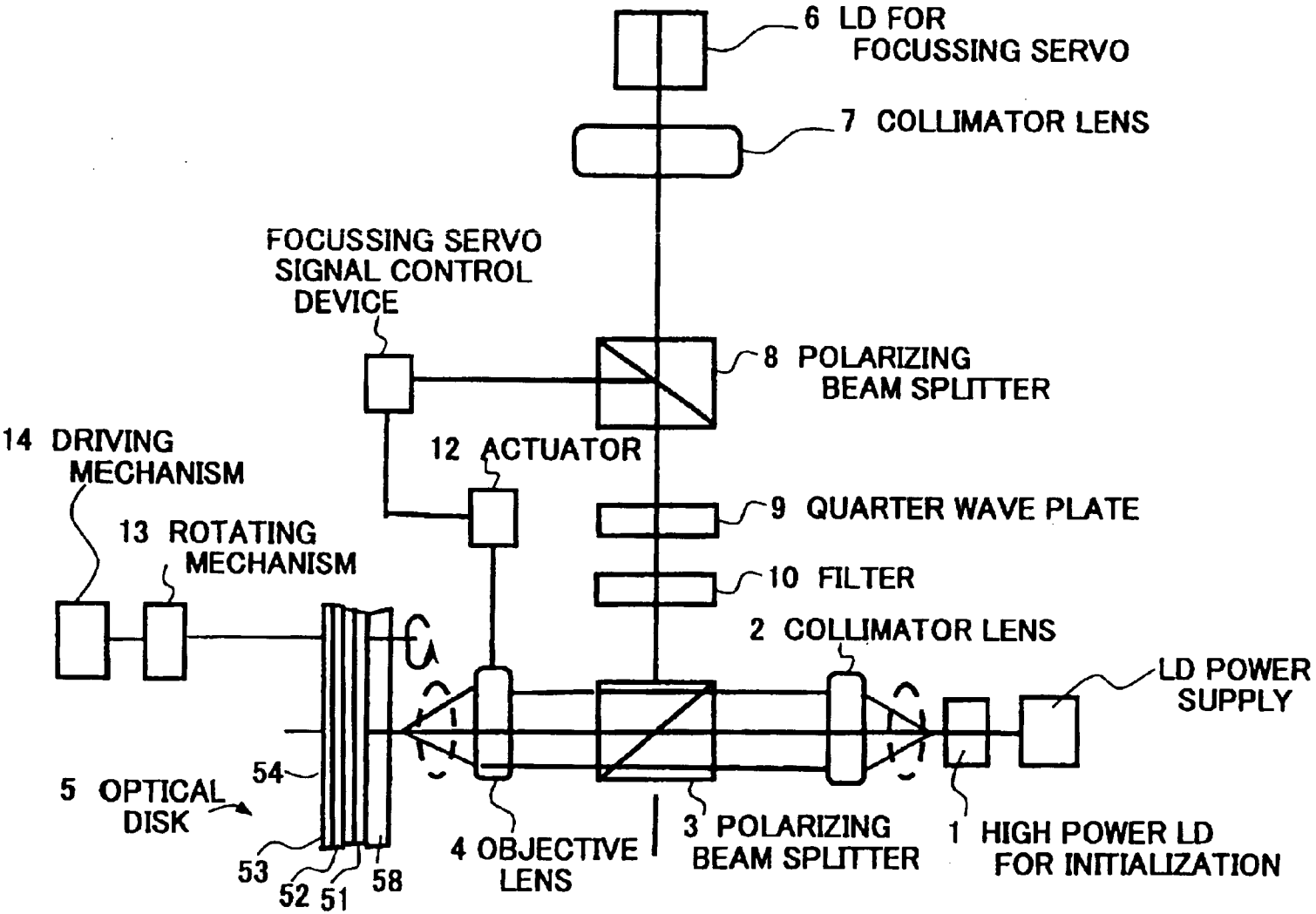
FIG. 2 is a schematic diagram illustrating a optical system used in initialization operations of an optical disk according to one embodiment disclosed herein.

The high power LD device for use in the initialization typically has an active region with a thickness of about 100 nanometers and a width of about 100 to 300 microns, from which laser beams are emitted. The laser beams are directed to and then collimated through an optical system such as illustrated in FIG. 2. These laser beams are subsequently incident on an optical disk from the side of the substrate. The beams are focussed to irradiate a portion of the recording layer, thereby heating the portion to its crystallization temperature.

Figure 3:
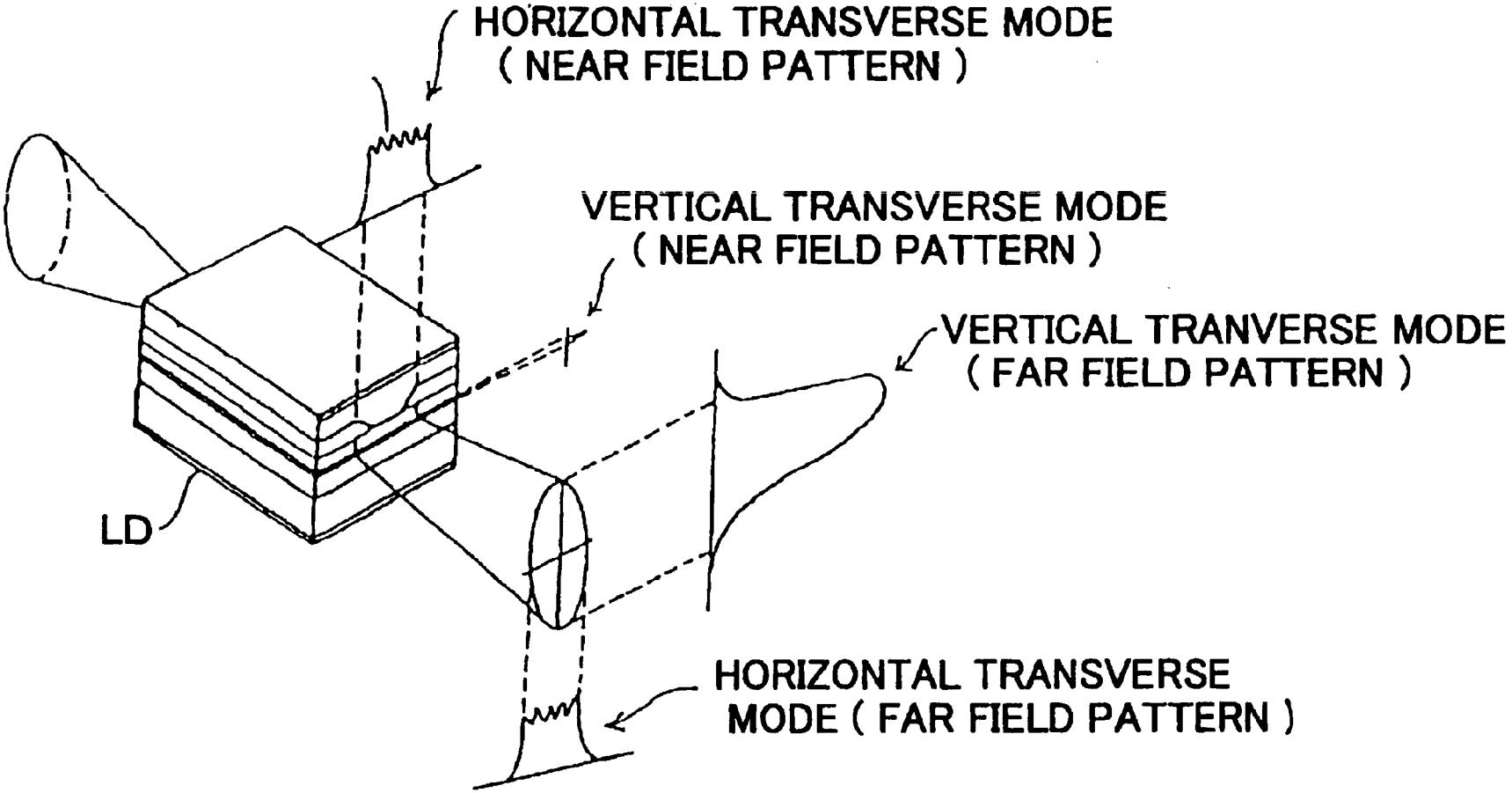
FIG. 3 is a perspective view illustrating light beams emitted from semiconductor laser device according to one embodiment disclosed herein.

The laser beams are emitted from the edge portion of the laser device as shown in FIG. 3. Resembling the shape of the edge portion, the spatial power distribution of the emitted laser beams is typically known in the shape of an elongated ellipse with the lengths of the minor and major axes of 0.2 to 40 microns and 80 to 200 microns, respectively. In order to irradiate the recording layer, the laser beams are focussed using the optical system further to a beam flux having the minor and major axes of 0.5 to 20 microns and 50 to 150 microns, respectively.

The energy distribution of the beams emitted from the laser device affects the energy distribution after the beam focussing. Further, this distribution along the major axis, in particular, does affect directly the final results of the initialization along the direction perpendicular to disk tracks of the phase-change recording medium.

In order for the recording layer be adequately initialized, the areas of the recording medium portion to be initialized are each irradiated at least once and preferably twice or more by the laser beams.

When the optical medium is disk in shape, the focussed beams can irradiate, during the period of one rotation of the disk, over a disk area which amount to the circular length multiplied by the major axis length of the ellipse of about 100 microns which corresponds to the aforementioned energy distribution of the laser beams.

Therefore, by selecting the distance of the laser device displacement perpendicular to the disk track during one disk rotation (i.e., the aforementioned displacement step) to be less than the above 100 microns, the disk areas can be each irradiated more than once for the initialization.

Accordingly, the time required for the initialization can be decreased considerably by increasing the distance of the laser displacement. As an example, when the distance of the laser device displacement is selected to be 80 microns with a laser device having the major axis length of beam distribution of 100 microns, the middle portion having a width of about 60 microns is irradiated once, as shown in FIG. 4A, while the side portions each having a width of about 20 microns are irradiated twice. If the distance of the laser device displacement is selected to be larger than the width at half maximum of the beam distribution, there give rise to the portions which are not irradiated at all, in which no initialization is made in these portions.

Therefore, measures may be taken for achieving satisfactory initialization as follows.

In the aforementioned example, an assumption is made that the second laser beam irradiation is carried out under the same conditions as the first irradiation, and the effects of the second irradiation onto the same side portion, which has the 20 micron width, are examined.

As a result, after the second laser heating, the 20 micron side portion tends to be excessively initialized (i.e., crystallized) and has a larger reflectivity compared to that of the middle portion, thereby resulting in undesirable scatter of tracking signals in the direction perpendicular to the disk tracks.

Since the 20 micron side portion is quenched for the time period before the second irradiation corresponding one disk rotation and its reflectivity changes accordingly, the above noted change in the 20 micron side portion after the second laser heating may not be simply twice as much as that of caused by the first irradiation. However, the results described above are still true from practical point of optical disk tracking.

This shortcoming of disk tracking such as described above is obviated by decreasing a laser power irradiating the side portions, which are irradiated twice as the aforementioned 20 micron side portions on the disk, compared to that irradiating the middle portion, which is irradiated once as the 60 micron middle portion.

When a laser device is fabricated by the ordinary design and manufacturing steps and then used for the initialization, energy distribution at side portions is generally found larger. As a result, as shown FIG. 4B, a larger reflectivity is caused in the 20 micron side portions, to thereby result in undesirable scatter of tracking signals in the direction perpendicular to the disk tracks.

In contrast, when a laser device is fabricated by the design specified according to the embodiment disclosed herein and utilized in an optical system for the initialization, the difference in reflectivity can be decreased between the 20 micron side portions and the 60 microns middle portion. As a result, dispersion of tracking signals can be decreased and the error rate is thereby considerably decreased in subsequent writing and reading steps of the optical recording medium, as seen in FIG. 4A.

The following example is provided further to illustrate a preferred embodiment disclosed herein. This is intended to be illustrative but not to be limiting to the processes or devices described herein.

EXAMPLE

On a 1.2 millimeter thick polycarbonate substrate having pre-grooved guide tracks of 0.5 micron width and 35 nanometers depth, the following layers were formed in the order recited with a sheet-type sputtering apparatus. These layers were a first dielectric layer having a thickness ranging from 65 nanometers to 130 nanometers, a recording layer having a thickness ranging from 15 nanometers to 35 nanometers, a second dielectric layer having a thickness ranging from 15 nanometers to 45 nanometers, and a reflective/heat-dissipating layer having a thickness ranging from 7 nanometers to 180 nanometers.

Subsequently, a hard coat and an overcoat layer were formed on the surface of the substrate with an ultraviolet curing resin deposited by spin coating, each having a thickness ranging from 2 microns to 6 microns and 7 microns to 15 microns, respectively. A phase-change optical disk was thus fabricated.

The optical recording layer was primarily composed of Ag, In, Sb and Te. For forming the first and second dielectric layers, the material ZnS—$SiO_2$ was used, and for the reflective layer, an aluminum alloy was used.

Initialization steps were subsequently carried out on the optical disk fabricated as above. For the initialization steps, a semiconductor laser device was used, which was prepared by polishing edge surfaces of at least one of its active layer and reflective layer, substantially perpendicular to the direction of the laser emission, according to the embodiment disclosed herein.

The spatial energy distribution of the light beams emitted from the semiconductor laser device was in the shape of an elongated ellipse, as described earlier.

Figure 5:
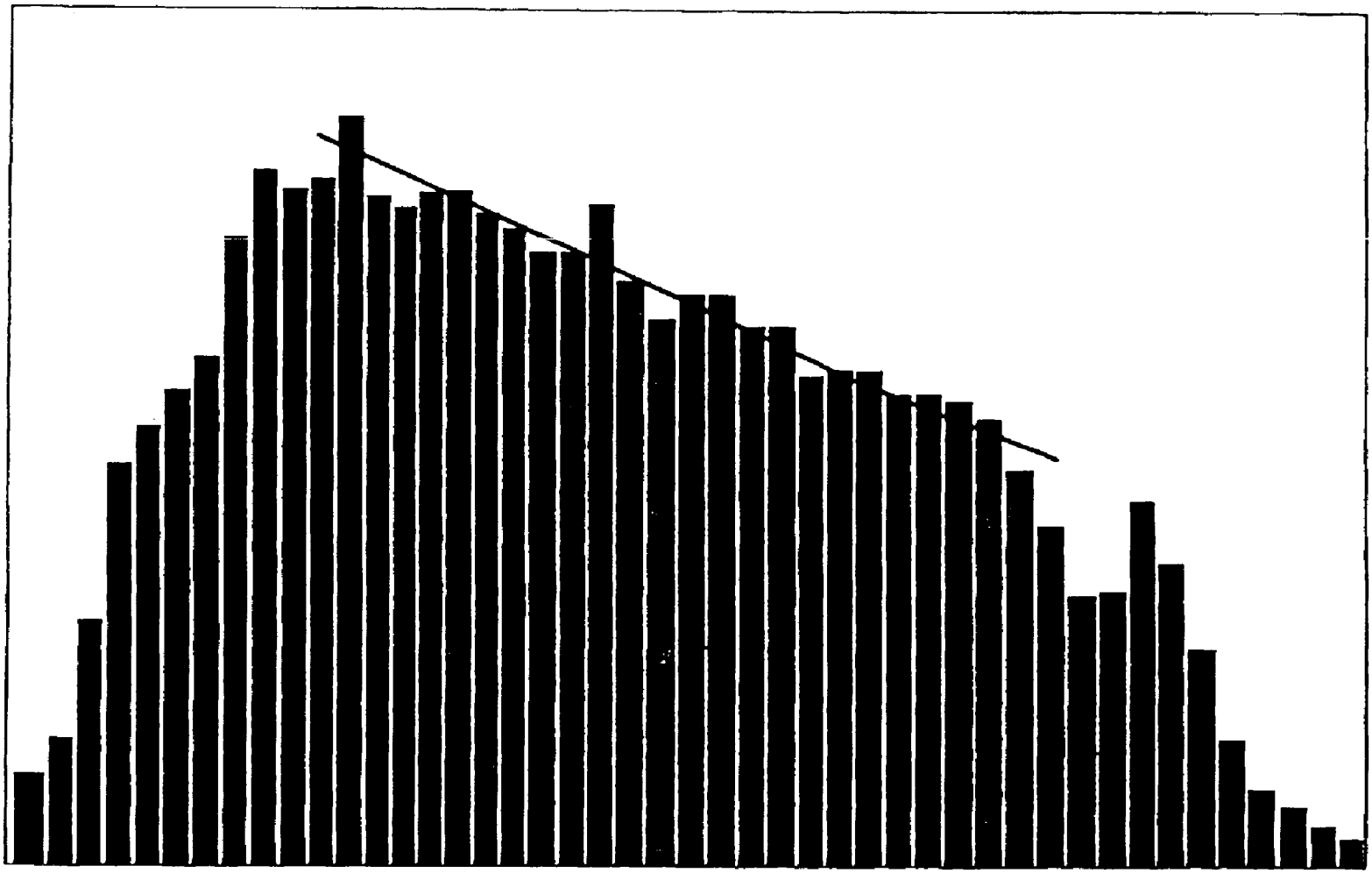
FIG. 5 shows laser power measurement results on an optical disk along the major axis of the distribution ellipse with a laser device according to one embodiment disclosed herein, in which edge surfaces of the laser device are polished.

The results from spatial energy distribution measurements along the major axis of the distribution ellipse were as shown in FIG. 5. Although the intensity appears to decrease toward the right hand side of the above distribution, this is caused by the characteristics of the apparatuses for the present measurements, and a flat feature at the middle portions of the distribution has been confirmed by separate intensity measurements.

In addition, it was also found from the above distribution measurement results that the width at half maximum is about 101 microns and that the average laser power in the side edge region of the distribution having the width of 10% (i.e., either from 0% to 10% or from 90% to 100%) of the width at half maximum, is from −5% to −10% of the average in the region of the full width at half maximum of the distribution.

In a similar manner, initialization steps were carried out using a background art semiconductor laser device without polishing edge surfaces.

Figure 6:
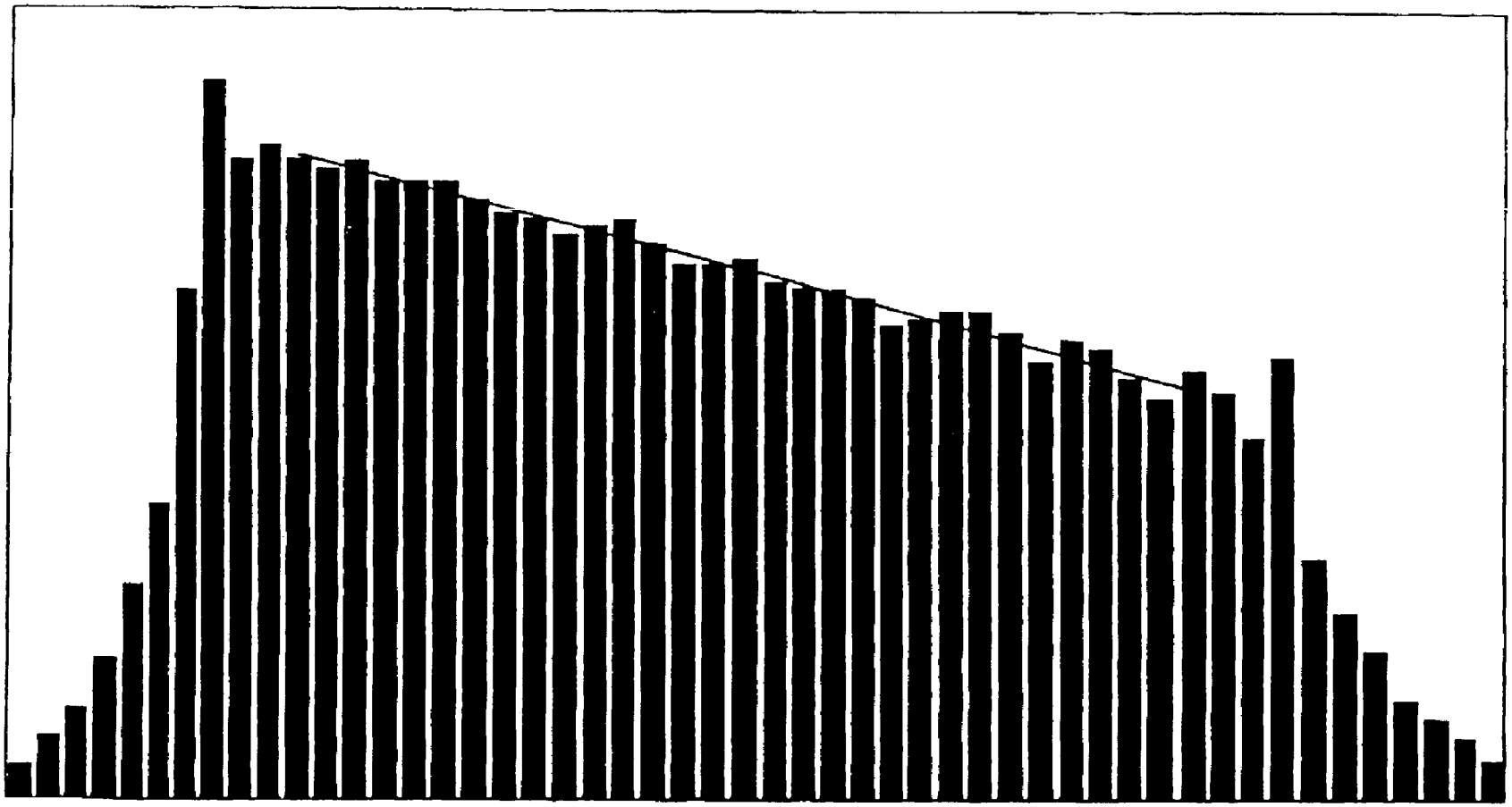
FIG. 6 PRIOR ART
FIG. 6 shows laser power measurement results on an optical disk along the major axis of the distribution ellipse with a background art laser device.

When the spatial energy distribution of the light beams emitted from this semiconductor laser device was measured, the results from the measurements along the major axis of the distribution were obtained as shown in FIG. 6, and the distribution was also found to have a width at half maximum of about 98 microns. In addition, it was found that the average laser power which was found in the side edge region of the distribution having the width of 10% of the width at half maximum, is from 0% to +13% of the average in the range of the full width at half maximum of the distribution.

Another background art semiconductor laser device similar to one used just above was then cured by being energized for 120 hours by its maximum allowable electric power for the blocking test. When the spatial energy distribution of the light beams emitted from this semiconductor laser device was subsequently measured, the results from the measurements along the major axis of the distribution were as shown in FIG. 7.

Figure 7:
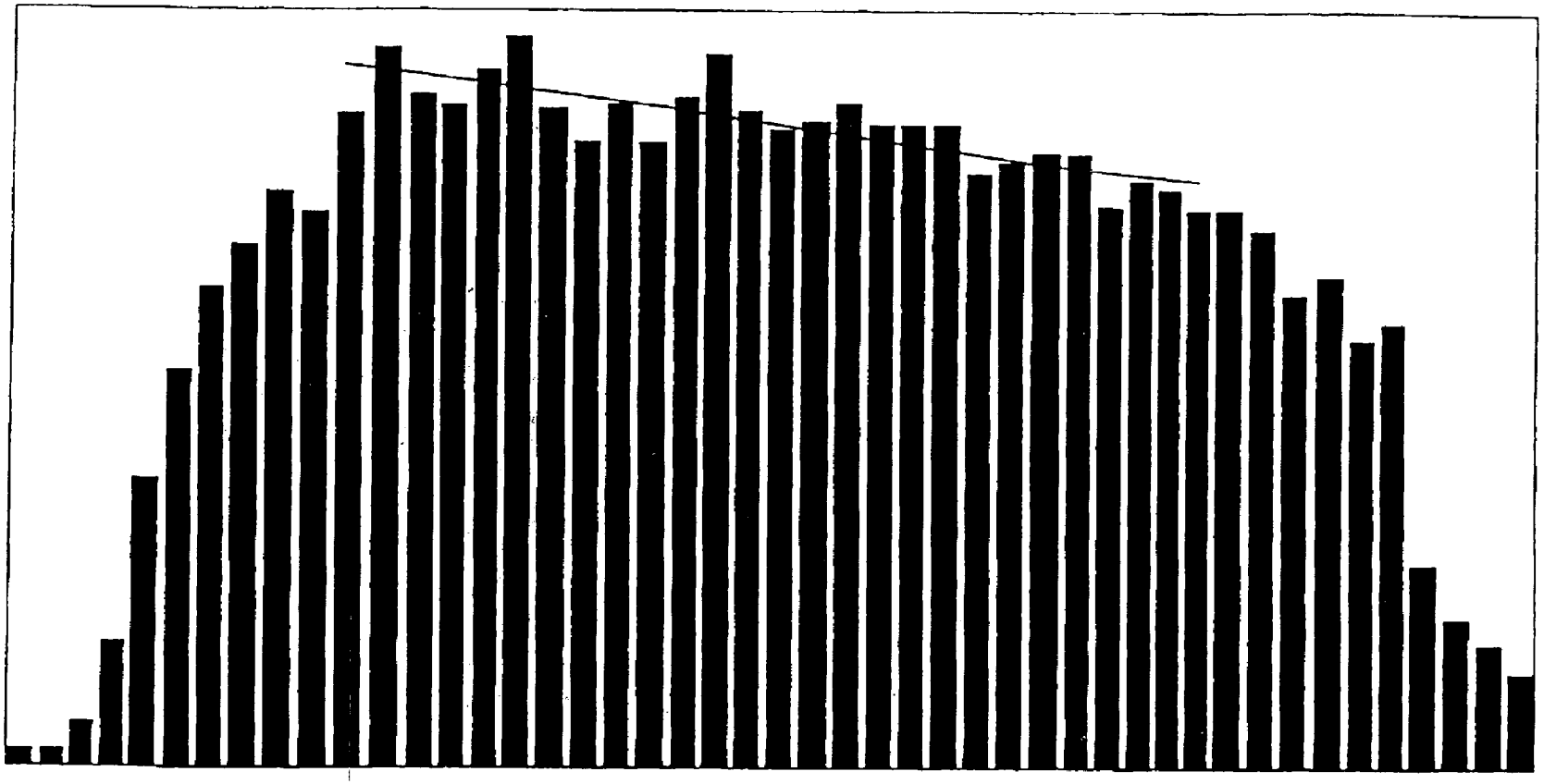
FIG. 7 shows laser power measurement results on an optical disk along the major axis of the distribution ellipse with a laser device according to another embodiment disclosed herein, in which a background art laser device is used after curing by being energized with an allowable electric power.

The above results indicate that an improvement has been made by the curing, in that the distribution in both edge regions is decreased as shown in FIG. 7, in spite of its average laser power prior to the curing which was found in the side edge region of the distribution having the width of 10% of the width at half maximum, was from ±5% to +10% of the average in the region of the full width at half maximum of the distribution.

When the distance of the laser device displacement (or displacement step) is chosen to be less than 50 microns for a laser device having the major axis length of beam distribution of 100 microns, the entire disk portions are irradiated at least twice. In this case, homogeneous disk quality can be attained by the initialization when it is carried out with relatively low laser power. However, the throughput for the 50 microns displacement distance step is decreased to be less than 65% of that for the 80 microns displacement step.

Therefore, a semiconductor laser device fabricated according to the embodiment disclosed herein and an optical system including the laser device are quite useful for optical disk initialization, when a displacement step ranging from 50 microns to 100 microns is adopted for a laser device having a major axis length of beam distribution of 100 microns.

As indicated hereinabove, using the thus prepared semiconductor laser device, the spatial distribution of laser power appropriate for disk initialization is obtained. In addition, with the optical system incorporating the laser device, a homogeneous crystallization and concomitant reflectivity of the recording layer in the optical disk, especially in the direction perpendicular to guide tracks, can be achieved through initialization steps. Dispersion of tracking signals can thereby be decreased, and the error rate is considerably decreased during writing and reading steps for the optical recording medium.

As a result, excellent characteristics of tracking signals and outputted data signals after the disk initialization can be achieved in a reduced initialization time to thereby be able to increase the production rate of optical disks by the method and system disclosed herein.

This document claims priority and contains subject matter related to Japanese Patent Application No. 10-367529, filed with the Japanese Patent Office on Dec. 24, 1998, the entire contents of which are hereby incorporated by reference.

Additional modifications to, and variations of, the embodiments described above may be made without departing from the spirit and the scope of the embodiments disclosed herein as defined in the appended claims.

What is claimed is:

1. A method of initializing a phase-change optical information recording medium, comprising the steps of:

providing a semiconductor laser device;

providing an optical system including said semiconductor laser device configured to be utilized for initializing said phase-change optical information recording medium; and irradiating at least a part of said phase-change optical information recording medium by means of light beams emitted from said semiconductor laser device;

wherein, in the spatial distribution of the semiconductor laser power focused on said recording medium in the direction perpendicular to guide tracks, said semiconductor laser device has an average *laser power* in a first end region with a first predetermined width, and a second end region with a second predetermined width, of the width at half maximum of the spatial distribution, smaller than an average *laser power* in the center region of the full width at half maximum of the spatial distribution.

2. The method of initializing a phase-change optical information recording medium according to claim 1, wherein said first predetermined width is at 0% to 10% of the width at half maximum of the spatial distribution and said second predetermined width is at 90% to 100% of the width at half maximum of the spatial distribution.

3. The method of initializing a phase-change optical information recording medium according to claim 1, wherein said step of providing said semiconductor laser device includes polishing edge surfaces of at least one of an active layer and a reflective layer of said semiconductor laser device, substantially perpendicular to the direction of the laser emission, such that [an] *the* average [of the] laser power in at least one of the end regions of the laser power distribution at 0% to 10% and 90% to 100% of the width at half maximum of the spatial distribution is smaller than [an] *the* average [of] laser power in the center region of the full width at half maximum of the spatial distribution.

4. The method of initializing a phase-change optical information recording medium according to claim 1, further comprising the step of:

providing at least one optical device in said optical system, configured to attenuate the light beams emitted from said semiconductor laser device such that [an] *the* average [of the] laser power in at least one of the end regions of the laser power distribution ranging at 0% to 10% and 90% to 100% of the width at half maximum of the spatial distribution is smaller than [an] *the* average [of] laser power in the center region of the full width at half maximum of the spatial distribution.

5. The method of initializing a phase-change optical information recording medium according to claim 4, wherein said optical device is an optical filter.

6. The method of initializing a phase-change optical information recording medium according to claim 1, wherein said semiconductor laser device is cured by energizing for at least about six hours with at least about 80% of a maximum allowable electric power prior to said initializing said recording medium such that [an] *the* average [of the] laser power in at least one of the end regions of the laser power distribution at 0% to 10% and 90% to 100% of the width at half maximum of the spatial distribution is obtained to be smaller than [an] *the* average [of] laser power in the center region of the full width at half maximum of the spatial distribution.

7. The method of initializing a phase-change optical information recording medium according to claim 1, wherein a distance of the laser device displacement perpendicular to the guide tracks per disk rotation is larger than one half of; and smaller than, the width at half maximum of the spatial laser power distribution of said light beams on said recording medium.

8. The method of initializing a phase-change optical information recording medium according to claim 7, wherein said semiconductor laser device has laser emissions having a width at half maximum of at least 80 microns of the spatial power distribution on said recording medium in the direction perpendicular to guide tracks.

9. A method of initializing a phase-change optical information recording medium comprising the steps of:

directing an energy beam at a phase-change optical information recording medium;

causing relative motion between the beam and the medium;

said relative motion causing the beam to irradiate successive bands of the medium that partly overlap; and said beam having a power distribution and said overlap being to a degree causing the irradiated areas of the medium to receive substantially the same cumulative energy from the beam despite said overlap.

10. A method as in claim 9 in which said energy beam is a laser beam generated at a laser device.

11. A method as in claim 10 including the step of polishing the laser device to achieve a laser beam power distribution configured to achieve said substantially same cumulative amount of energy despite said overlap.

12. A method as in claim 10 including the step of filtering the laser beam prior to its reaching the medium to achieve a laser beam power distribution configured to achieve said substantially same cumulative amount of energy despite said overlap.

13. A method as in claim 10 including the step of curing the laser device prior to initializing the medium to alter the power distribution of the laser beam to a distribution achieving said substantially same cumulative amount of energy despite said overlap.

*14. An apparatus for initializing a phase-change optical information recording medium, comprising:*

*a semiconductor laser device configured to irradiate the phase-change optical information recording medium with a light beam to initialize the phase-change optical information recording medium;*

*wherein in the spatial distribution of the semiconductor laser power focused on said recording medium in the direction perpendicular to guide tracks, said semiconductor laser device has an average laser power in a first end region with a first predetermined width, and a second end region with a second predetermined width, of the width at half maximum of the spatial distribution, smaller than an average laser power in the center region of the full width at half maximum of the spatial distribution; and*

*wherein the semiconductor laser comprises at least one of an active layer and a reflection layer, and wherein a surface of the at least one of an active layer and an reflection layer perpendicular to an emitting surface of the semiconductor laser is polished.*

*15. The apparatus according to claim 14, wherein the first predetermined width is at 0% to 10% of the width at half maximum of the spatial distribution and the second predetermined width is at 90% to 100% of the width at half maximum of the spatial distribution.*

* * * * *